United States Patent [19]

Ohlson

[11] 4,224,721
[45] Sep. 30, 1980

[54] DEVICE FOR CLAMPING TWO GENERALLY PARALLEL DIRECTED MEMBERS

[76] Inventor: Kurt L. Ohlson, Moravägen 27, 161 42 Bromma, Sweden

[21] Appl. No.: 888,958

[22] Filed: Mar. 22, 1978

[30] Foreign Application Priority Data

Mar. 28, 1977 [SE] Sweden ................ 7703556

[51] Int. Cl.² ........................................ A44B 21/00
[52] U.S. Cl. ............................ 24/81 TH; 248/68 CB
[58] Field of Search ............ 24/81 CC, 81 BA, 81 G, 24/81 TH, 132 R; 248/68 CB; 339/249 R; 403/391

[56] References Cited

U.S. PATENT DOCUMENTS

| | | | |
|---|---|---|---|
| 1,397,290 | 11/1921 | Nelson | 24/81 G |
| 2,560,723 | 7/1951 | Hansen | 24/132 R |
| 3,023,989 | 3/1962 | White | 24/81 CC |
| 3,188,138 | 6/1965 | Lockshin | 24/81 CC |
| 3,894,706 | 7/1975 | Mizusawa | 24/81 CC |

FOREIGN PATENT DOCUMENTS

| | | | |
|---|---|---|---|
| 77865 | 3/1962 | France | 24/81 CC |
| 1122022 | 7/1968 | United Kingdom | 24/81 CC |
| 1217182 | 12/1970 | United Kingdom | 403/391 |

*Primary Examiner*—J. Franklin Foss

[57] ABSTRACT

Device for clamping two parallel directed means, comprising two mutually cooperating parts. One part having one or more grooves, each groove intended to surround partially a means intended for said groove. The second part is turnable attached to said first part in order to expose the grooves and cause the means to cooperation in a first position and to clamp the means in a second position. Said second part is formed with plane surfaces intended, by turning from said first to said second position, to slide along the means and press the means into the grooves.

8 Claims, 6 Drawing Figures

DEVICE FOR CLAMPING TWO GENERALLY PARALLEL DIRECTED MEMBERS

FIELD OF THE PRESENT INVENTION

The present invention refers to a device, which may clamp two parallel directed or oriented or at least essentially parallel directed means, comprising two mutually cooperating parts. The one part is formed with two or more grooves, each groove intended to partially surround a means related to said groove, and the other part is turnable attached to said first part, in order to expose the grooves in a first position and cause the means to cooperate with its groove, and in a second position clamp the means in the groove.

BACKGROUND OF THE PRESENT INVENTION

It has been suggested to use a device of the design mentioned above in order to clamp two parallel or at least essentially parallel directed means. Devices of this kind may be used within a plurality of fields but as an exemplary field is mentioned the task to keep two juxtapositioned tubes forming a frame for a sign, a wall structure or the like in fixed position.

OBJECTS OF THE PRESENT INVENTION

In this field it is necessary that the device, which shall clamp the means, shall be actuated quickly, to clamp and to release the means. At the same time the device must stand high forces. High forces are caused when two long parallel oriented or directed means are forced out of its parallel direction, because the device has a limited extension along the means.

A further object is that that the two parts shall very easily be interconnected with eachother when assemblied but must stand the high forces mentioned.

The present invention has as its main object to give advice about a device which eliminates the above stated disadvantageous and fulfils the above stated demands.

BRIEF DESCRIPTION OF THE ACCOMPANYING DRAWINGS

A preferred embodiment having the novel features of the present invention will now be described with reference to the accompanying drawings, in which FIG. 1 shows a device for clamping two parallel directed means comprising of two mutually cooperating parts and where the parts are arranged in such a position that two means may cooperate with the device.

DESCRIPTION OF A PREFERRED EMBODIMENT

Figure 1:
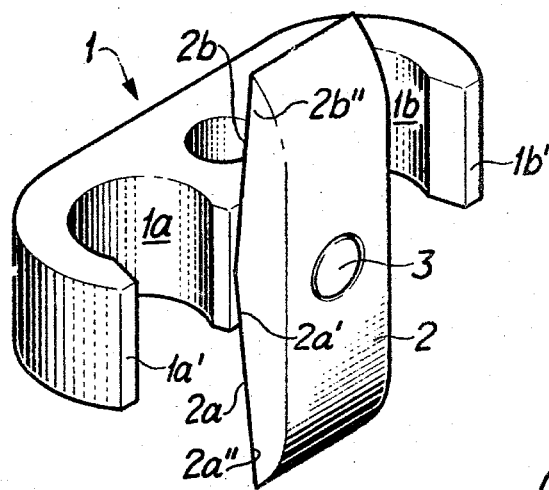

The present invention consisting of a device intended to clamp two parallel directed means. The means are not shown in the drawings for clarifying purposes, but it is obvious that these means may have different forms, thus in the shown embodiment it has been suggested a circular cross-section, and thus tube-formed.

The device consisting of two mutually cooperating parts 1 and 2, the one part 1 is formed with two or more grooves 1a resp. 1b and each groove is intended to surround partially (more than half) the means related to said groove. Essential for the invention is that the groove is formed with a predetermined support surfaces in order to support the means and in the shown embodiment these surfaces are combined into a circular surface intended to cooperate with a circular tube or rod. A longitudinal axis of the groove 1a, which groove includes a circular support surface, is substantially parallel to a longitudinal axis of the groove 1b, which groove also includes a circular support surface. The second part 2 is rotatably attached to one part 1 in order to be set in a first position, shown in FIG. 1, wherein the grooves 1a and 1b for the means are exposed and to be set in a second position, shown in FIG. 2, wherein the means are clamped. An axis of rotation of the second part 2 is substantially perpendicular to the longitudinal axes of the grooves 1a and 1b.

The second part 2 is formed with plane surfaces 2a and 2b and these are intended, by turning from the first position (FIG. 1) to the second position, (FIG. 2), to slide along the outer surface of the means and press this means into the groove 1a resp. 1b. By this turning the force from part 2 acting upon the means will increase to a maximum when the part 2 is set in a intermediate position and decrease towards the position shown in FIG. 2. The plane surface can be formed by a first plane surface 2a and a second plane surface 2a". If the plane surface is designated in accordance with the last mentioned form the part 2 will have two plane surfaces 2a" and 2b" arranged on each side of the turning centre 3 and being oriented in one and the same plane.

The grooves 1a and 1b are intended to surround the means in an extent exceeding half its circumference but below 300°. At the same time the part 1 must be of such a resilient material that the portions 1a and 1b may bend from eachother and surround the means.

According to the embodiment the one part 1 has a tenon and the second part 2 has a hole. Part 2 may have the tenon and part 1 the hole. The tenon has an elliptic form and the hole has a corresponding elliptic form, which means that the parts in their first position (FIG. 1) can be assemblied by a movement towards eachother but in their second position (FIG. 2) they are interconnected, while the major axis for the two elliptic forms are perpendicular to each other.

Figure 3:
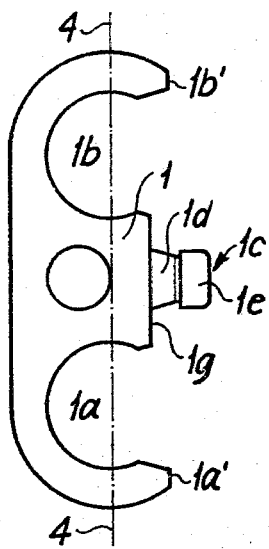
FIG. 3 shows a side elevation view of one part of the device.
Figure 5:
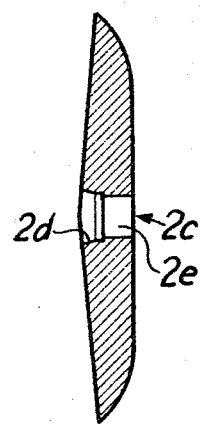
FIG. 5 shows a side elevation view and in section the second part of the device and FIG. 6 shows another side elevation view of the second part of the device.

In FIG. 3 shows a side elevation view of the first part 1 and it is obvious that the tenon 1c has a cylindrical surface 1d and an elliptic collar 1e. Only the collar is elliptic. The grooves 1a and 1b is also shown. If it is assumed that the radius is 17 mm the plane surface shall be 7 mm from the centre, while the parts 1b and 1a shall be 10 mm from a centre plane 4. In FIG. 5 is shown a side elevation view of the second part and this part has an elliptic surface 2d and a surface 2e. The collar 1e and the surface 2d have both the same elliptic form.

Figure 2:
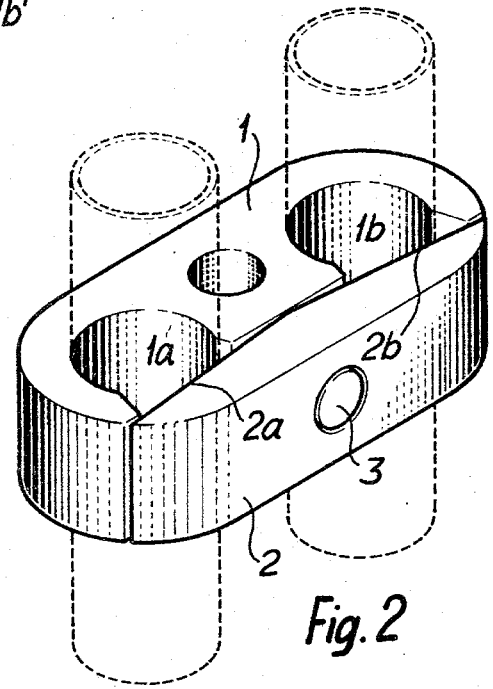
FIG. 2 shows the device according to FIG. 1 where the two parts are arranged in such a position where the means are clamped.
Figure 4:
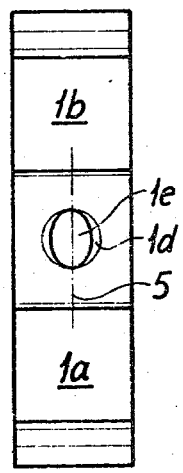
FIG. 4 shows an other side elevation view of one part of the device.
Figure 6:
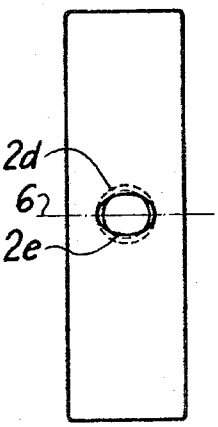

In FIG. 4 is suggested the major axis for the elliptic form shall be in a plane designated 5 and in FIG. 6 the axis shall be in a plane designated 6. The planes 5 and 6 must coinside when the parts 1 and 2 shall be pressed together. In FIG. 2 is shown that the parts are interconnected due to the fact that the major axis 5 and 6 are turned into right angle.

This elliptic form is such that the difference between major axis and the minor axis is small.

It should be noted that the circular surface 1d has a diameter corresponding to the minor axis of part 2d while the circular surface 1e has a diameter corresponding to the major axis of the collar 1e.

The invention is not restricted to the shown embodiment but may be modified within the scope of the succeeding claims.

What I claim is:

1. Device for clamping two generally parallel members, comprising:

first and second mutually cooperating parts;

the first part having at least two grooves, which grooves are aligned along longitudinal axes which axes are substantially parallel to one another, and each groove arranged to partially surround one of said generally parallel members; and, the second part being rotatably attached to said first part, which second part rotates about an axis which is substantially perpendicular to said longitudinal axes in order to expose the grooves in a first position and, in a second position, to clamp the members, said second part being provided with plane surfaces which slide along the members and urge the members into the grooves as the second part is rotated from the first position to the second position, each of said grooves having an opening for receiving the corresponding one of the parallel members, said opening having a normal width narrower than a normal width of the groove.

2. Device according to claim 1, wherein the plane surfaces include a first plane surface and a second plane surface, both the first and second plane surface diverging from the axis of turning.

3. Device according to claim 1, wherein the plane surfaces include two plane surfaces with one plane surface provided on each side of the axis of turning, both plane surfaces being arranged in one and the same plane.

4. Device according to claim 1, wherein one part has a tenon and the other part has a hole.

5. Device of claim 1 wherein each of the grooves extends more than 180° but less than 300° in circumference.

6. Device of claim 1 wherein the first part is of resilient material.

7. Device for clamping two generally parallel members, comprising:

first and second mutually cooperating parts;

the first part having at least two grooves, each groove arranged to partially surround one of said generally parallel members;

the second part being rotatably attached to said first part to expose the grooves in a first position and, in a second position, to clamp the members, said second part being provided with plane surfaces which slide along the members and urge the members into the grooves as the second part is rotated from the first position to the second position, each of said grooves having an opening for receiving the corresponding one of the parallel members, said opening having a normal width narrower than a normal width of the groove; and the first part and the second part cooperating with each other via a hole and a tenon, the tenon being provided on one of the parts and having an elliptical portion, the hole being provided on the other part, and the hole having an elliptical shape corresponding to the tenon whereby the first and the second parts may be readily assembled together with major axes of the elliptical portion of the tenon and of the hole being aligned with one another.

8. Device of claim 7 wherein the major axes are generally perpendicular to one another when the parts are in the second position.

* * * * *